(12) United States Patent
Smith et al.

(10) Patent No.: US 7,118,081 B2
(45) Date of Patent: Oct. 10, 2006

(54) ADJUSTABLE SUPPORT FOR MULTIMEDIA DISPLAY DEVICE

(75) Inventors: David L. Smith, Corvallis, OR (US); Dennis R. Esterberg, Philomath, OR (US); Timothy M. Souza, Lebanon, OR (US); Jeffrey Scott Bakkom, Corvallis, OR (US); Dennis Prows, Cincinnati, OH (US); Steven Douglas MacFarlane, Tampa, FL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 118 days.

(21) Appl. No.: 10/987,056

(22) Filed: Nov. 12, 2004

(65) Prior Publication Data

US 2005/0109896 A1    May 26, 2005

Related U.S. Application Data

(63) Continuation-in-part of application No. 10/946,778, filed on Sep. 22, 2004.

(51) Int. Cl.
*F16M 11/24* (2006.01)

(52) U.S. Cl. .......................... 248/188.2; 353/69; 353/70

(58) Field of Classification Search ............. 248/188.2, 248/188.4, 188.8, 188.1, 673, 677; 312/223.2; 353/119, 70, 69
See application file for complete search history.

(56) References Cited

U.S. PATENT DOCUMENTS

| | | | |
|---|---|---|---|
| 2,756,956 A | 7/1956 | Anderson | |
| 3,030,730 A | 4/1962 | Costar | |
| 3,704,848 A | 12/1972 | Trebes et al. | |
| 4,141,523 A | 2/1979 | Brendgens | |
| 4,925,137 A | 5/1990 | Hastings | |
| 5,153,633 A | 10/1992 | Otani | |
| 5,630,659 A | 5/1997 | Ronzani et al. | |
| 5,676,442 A | 10/1997 | Fujimori | |
| 5,743,610 A | 4/1998 | Yajima et al. | |
| 5,818,950 A | 10/1998 | Sakamoto et al. | |
| 5,909,944 A | 6/1999 | Yajima et al. | |
| 6,007,205 A | 12/1999 | Fujimori | |
| 6,095,653 A | 8/2000 | Yajima | |
| 6,302,543 B1 | 10/2001 | Arai et al. | |
| 6,461,002 B1 | 10/2002 | Su | |
| 6,523,799 B1 | 2/2003 | Su | |
| 6,715,890 B1 | 4/2004 | Huang et al. | |
| 2002/0140909 A1 | 10/2002 | Tanaka | |
| 2003/0038927 A1 | 2/2003 | Alden | |
| 2003/0038928 A1 | 2/2003 | Alden | |
| 2003/0202162 A1 | 10/2003 | Arai et al. | |
| 2003/0227601 A1 | 12/2003 | Chang | |

*Primary Examiner*—Ramon O Ramirez

(57) ABSTRACT

An adjustable support for a multimedia display device includes a base, a ring rotatably coupled with the base, and a foot mated with the ring and coupled with the base. The ring includes a plurality of ramp surfaces, and the foot includes a plurality of engaging surfaces. The plurality of ramp surfaces are separate from each other and distributed at substantially equal intervals along a common circumference, and each of the engaging surfaces interacts with a respective one of the ramp surfaces, wherein rotation of the ring relative to the base causes each of the engaging surfaces to slide along the respective one of the ramp surfaces to vary a distance the foot extends from the base.

44 Claims, 11 Drawing Sheets

ADJUSTABLE SUPPORT FOR MULTIMEDIA DISPLAY DEVICE

CROSS-REFERENCE TO RELATED APPLICATIONS

This application is a Continuation-In-Part of co-pending U.S. patent application Ser. No. 10/946,778, filed on Sep. 22, 2004, assigned to the Assignee of the present invention, and incorporated herein by reference.

BACKGROUND

Image projectors are commonly used to project slide presentations or other images onto a screen or projection surface to aid in business presentations, classroom presentations, recreational or home viewing, etc. When projecting an image, the image projector is typically placed on a platform or support surface such as a desk, table, shelf, cart, etc.

Characteristics of the support surface, such as the height and/or orientation of the support surface, however, may affect the projected image. For example, if the support surface is not level, the projected image may be skewed or distorted. In addition, if the support surface is not at a proper height with respect to the projection surface, the projected image may not be seen on or may only partially be seen on the projection surface.

Accordingly, it is desirable for an adjustable device for increasing the height of the image projector, increasing the angle at which the image is projected, and/or adjusting the orientation of the image projector.

SUMMARY

Once aspect of the present invention relates to an adjustable support for a multimedia display device. The adjustable support includes a base, a ring rotatably coupled with the base, and a foot mated with the ring and coupled with the base. The ring includes a plurality of ramp surfaces, and the foot includes a plurality of engaging surfaces. The plurality of ramp surfaces are separate from each other and distributed at substantially equal intervals along a common circumference, and each of the engaging surfaces interacts with a respective one of the ramp surfaces, wherein rotation of the ring relative to the base causes each of the engaging surfaces to slide along the respective one of the ramp surfaces to vary a distance the foot extends from the base.

DETAILED DESCRIPTION

In the following detailed description, reference is made to the accompanying drawings which form a part hereof, and in which is shown by way of illustration specific embodiments in which the invention may be practiced. In this regard, directional terminology, such as "upper," "lower," "downward," "upward," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
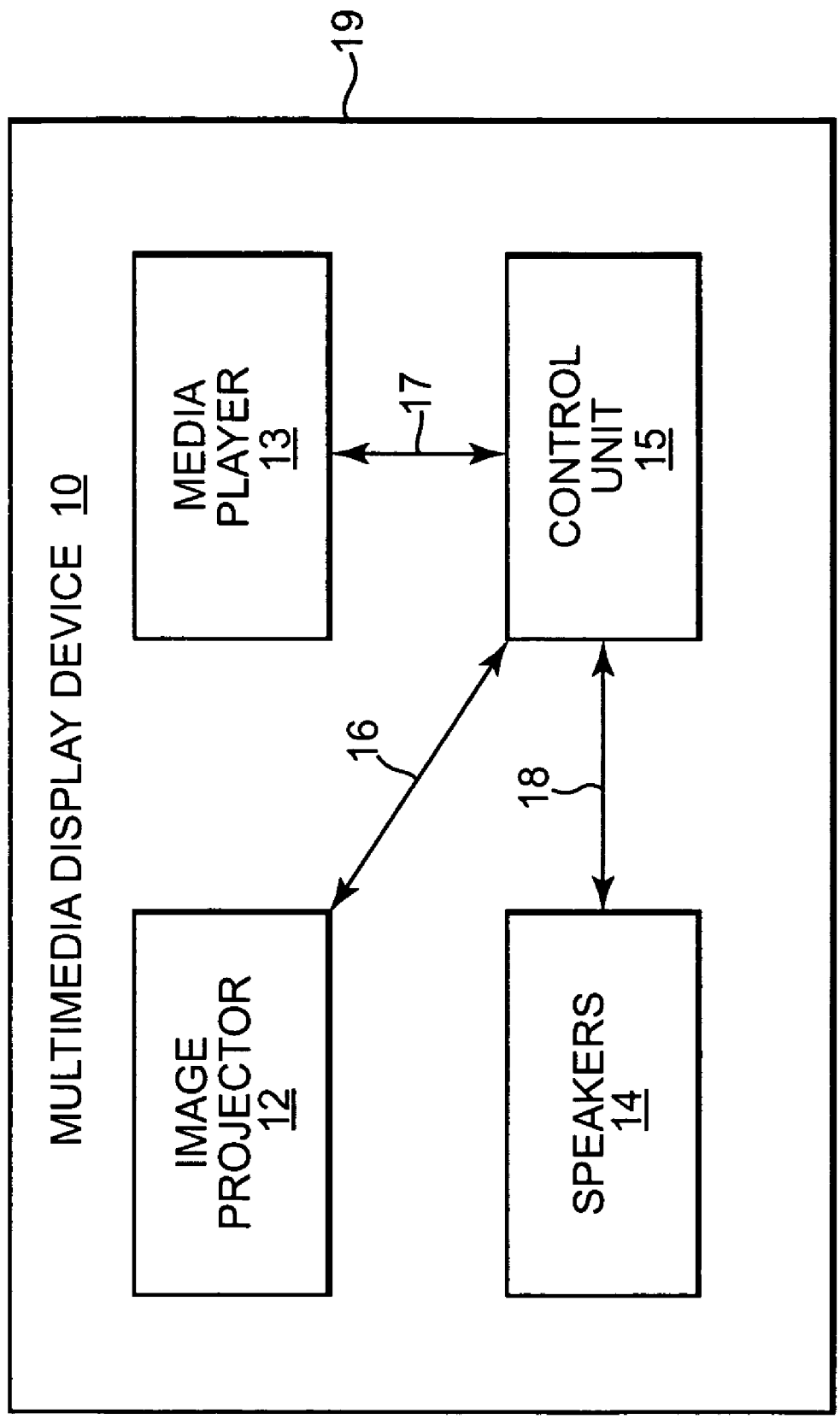
FIG. 1 is a block diagram illustrating one embodiment of a multimedia display device.

FIG. 1 illustrates one embodiment of a multimedia display device 10. Multimedia display device 10 includes an image projector 12, a media player 13, one or more speakers 14, and a control unit 15. Image projector 12 receives a video signal and projects corresponding images to a viewing surface using various optical elements. Image projector 12 is any type of image projection device, such as, a liquid crystal display (LCD) projector, a digital light processing (DLP) projector, a liquid crystal or silicon (LCOS) projector, a slide projector, a film projector, etc.

Media player 13 provides audio and/or video content to image projector 12. In one embodiment, media player 13 provides the audio or video from a disc, such as a digital video disc (DVD), a compact disc (CD) (e.g., CD-ROM, CD-R, CD-RW, and CD+RW), or other disc configured to store audio and/or video content. Speakers 14 generate audible sounds in response to audio inputs, such as audio inputs from media player 13.

Control unit 15 includes a processor and memory and is coupled to each of image projector 12, media player 13, and speakers 14 via electrical and/or communication links 16, 17, and 18, respectively. In one embodiment, control unit 15 provides signals to image projector 12, media player 13, and speakers 14 to control the power supply to each, provide instructions to each, and coordinate the respective functioning of each of image projector 12, media player 13, and speakers 14.

In one embodiment, one or more components of multimedia display device 10 are housed within a housing 19. For example, housing 19 may contain image projector 12, media player 13, control unit 15, and one or more speakers 14. In one embodiment, as described below, housing 19 includes a first portion housing image projector 12, media player 13, and control unit 15, and a second portion housing one or more speakers 14.

Figure 2:
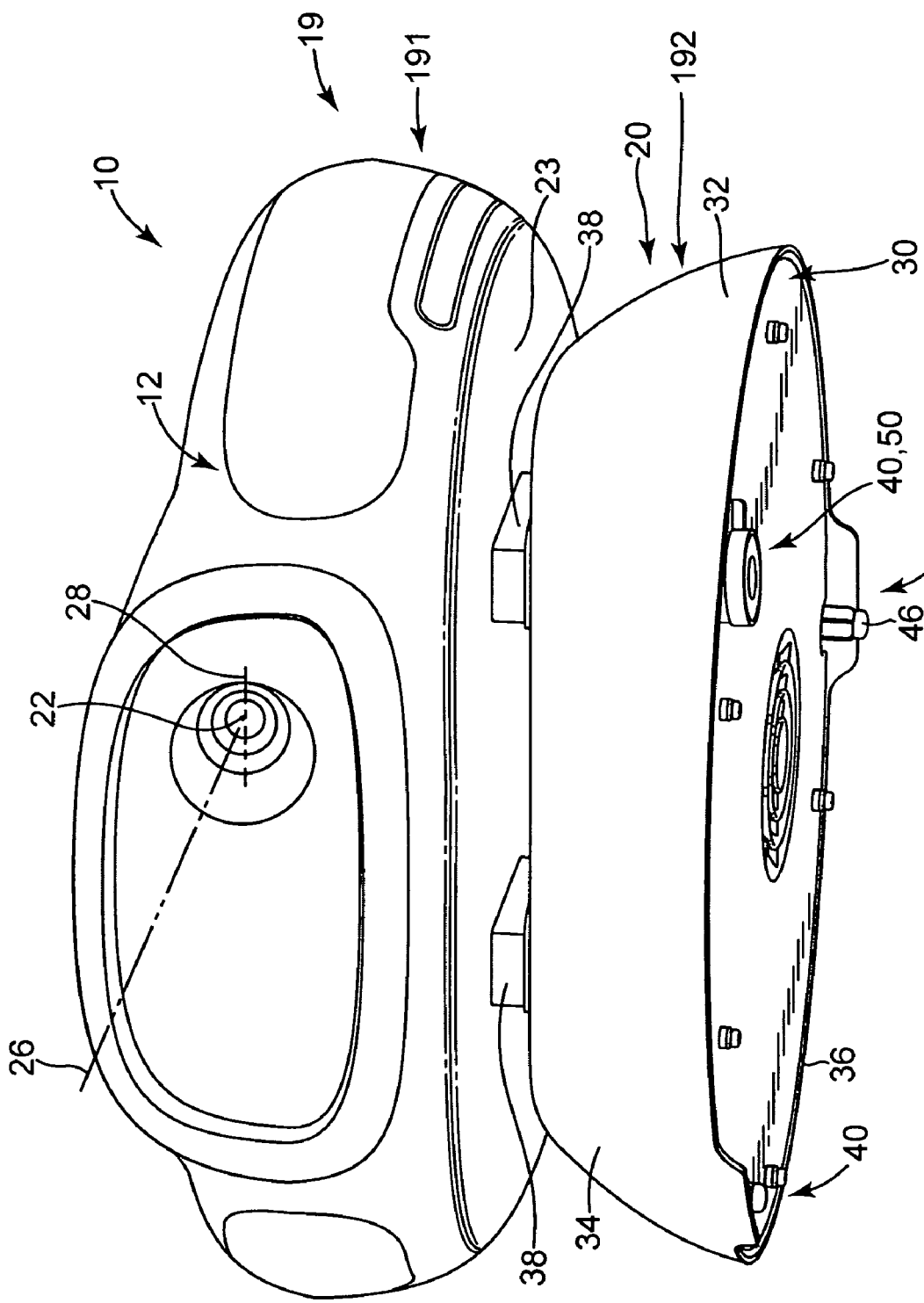
FIG. 2 is a bottom perspective view illustrating one embodiment of the multimedia display device.

FIG. 2 illustrates one embodiment of multimedia display device 10 including image projector 12 and a support assembly 20 which forms a portion of housing 19. In one embodiment, image projector 12 is supported by and mounted to support assembly 20. In one embodiment, housing 19 includes a first portion 191 and a second portion 192 such that image projector 12 is housed within first portion 191 of housing 19 and speaker 14 is housed within second portion 192 of housing 19. As such, speaker 14 is positioned below image projector 12. In one embodiment, first portion 191 of housing 19 also includes or houses media player 13 and/or control unit 15 (FIG. 1). In one embodiment, image projector 12 additionally defines a lower surface 23 for selectively interacting with support assembly 20.

Figure 3:
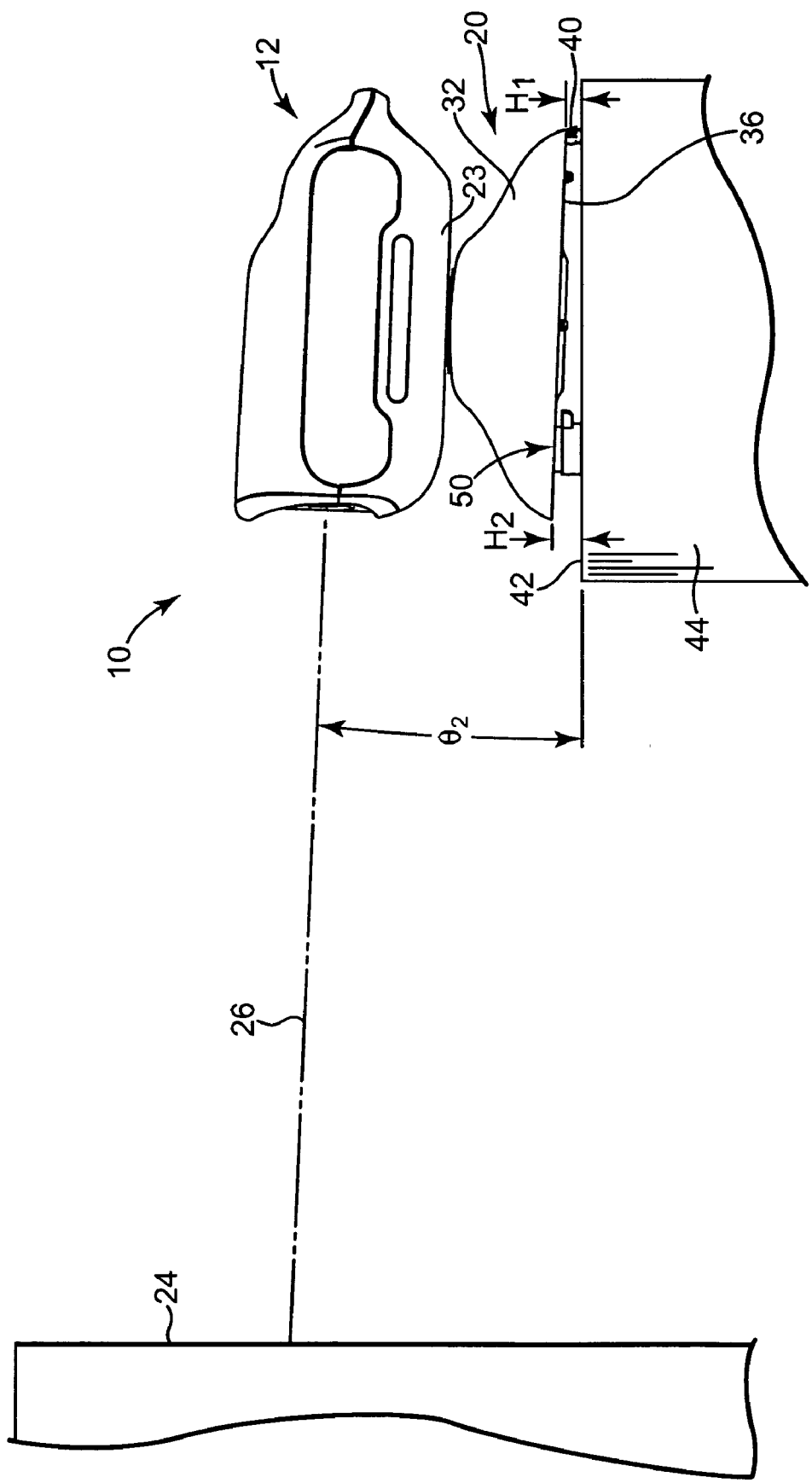
FIG. 3 is a side view illustrating one embodiment of the multimedia display device of FIG. 2 with an associated platform and a viewing surface.

In one embodiment, as illustrated in FIGS. 2 and 3, image projector 12 includes a lens 22 from which an image is projected towards a screen or other viewing surface 24. More particularly, light patterns defining images are projected from lens 22 to viewing surface 24. The projection of light is centered about a projection line 26 extending from lens 22 to viewing surface 24. In addition, a reference line 28 is defined extending across and through the center of lens 22 (i.e., through opposite points of the perimeter of lens 22) with an orientation substantially perpendicular to projection line 26.

Figure 4:
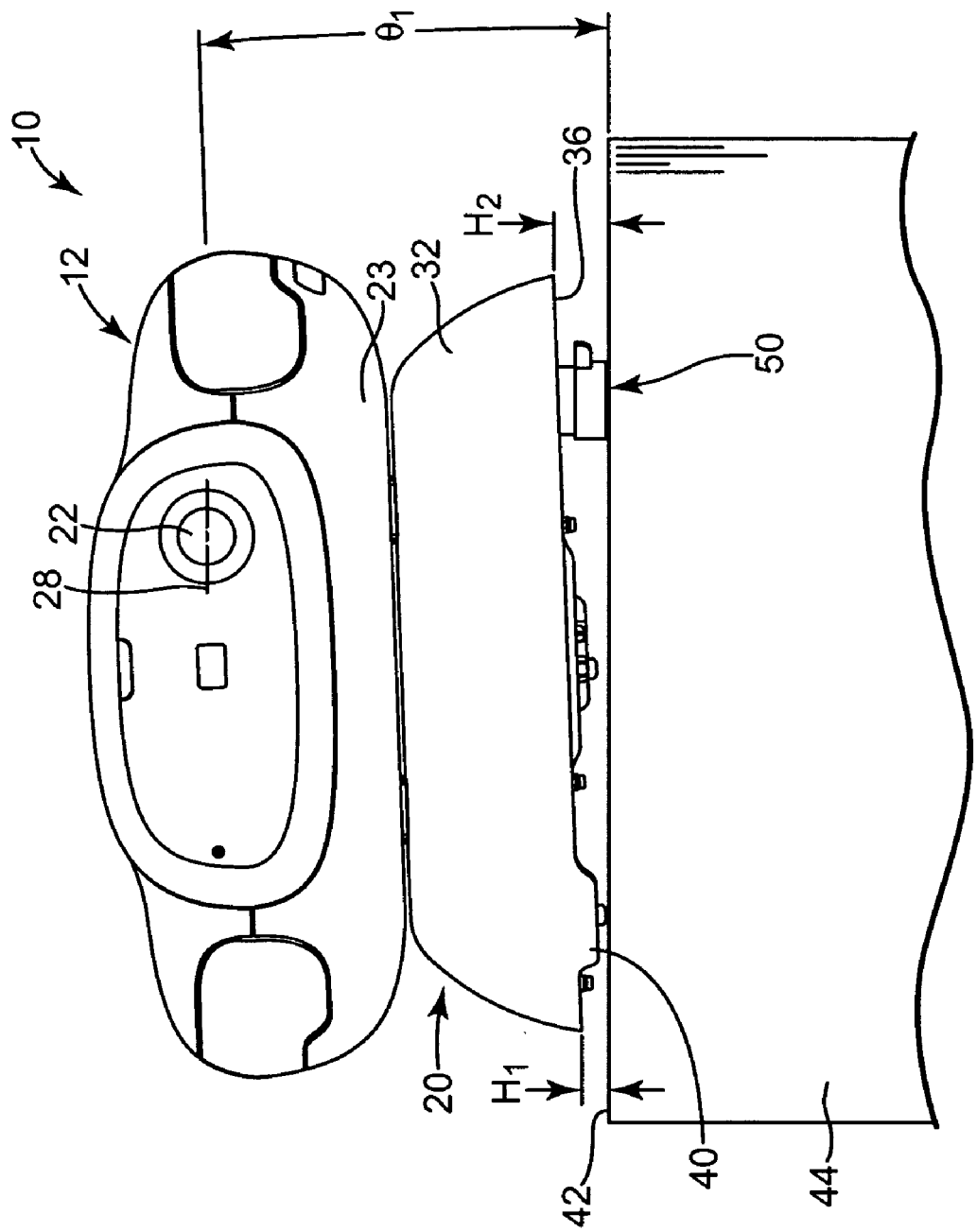
FIG. 4 is a front view illustrating one embodiment of the multimedia display device of FIG. 2 with an associated platform.

Support assembly 20 supports image projector 12 and is configured to receive image projector 12 in either a substantially horizontal orientation, one embodiment of which is illustrated in FIGS. 2–4, a substantially vertical orientation (not illustrated), or other intermediate orientation. Components of support assembly 20 may be composed of any material capable of providing structural support to the internal components of support assembly 20 as well as image projector 12 such as, plastics, metals, or composite materials. Similarly, support assembly 20 may be fabricated using any number of fabrication techniques including rotational molding, blow molding, deep draw molding, injection molding, casting, forging, stamping, etc.

In one embodiment, support assembly 20 includes a cabinet assembly 30 and a shell or shroud 32 at least partially enclosing cabinet assembly 30. In one embodiment, cabinet assembly 30 houses one or more components for use in conjunction with image projector 12. In one embodiment, cabinet assembly 30 houses one or more speakers 14 (FIG. 1).

In one embodiment, shell 32 has an external surface 34 shaped in a substantially convex manner and defines an internal cavity which encloses cabinet assembly 30. As such, a perimeter edge 36 is defined around the internal cavity between the internal cavity and external surface 34 of shell 32. In one embodiment, shell 32 includes docking projections 38 extending upward from external surface 34 and configured to be selectively or permanently received by corresponding recesses or other features in lower surface 23 of image projector 12. As such, image projector 12 may be supported by and selectively removed from support assembly 20.

In one embodiment, as illustrated in FIGS. 2–4, support assembly 20 further includes a plurality of supports 40 extending from perimeter edge 36 away from shell 32. More specifically, each support 40 extends downwardly from perimeter edge 36. In one embodiment, supports 40 are substantially equally spaced around perimeter edge 36, and each support 40 is configured to interact with a support surface 42 of a platform 44 such as a table, desk, shelf, cart, etc. In one embodiment, the plurality of supports 40 includes three supports 40 equally spaced about perimeter edge 36 to collectively form a tripod-like support for shell 32. In one embodiment, one or more supports 40 additionally includes a friction enhancing portion or anti-skid foot or surface 46 for interacting with support surface 42 to substantially prevent or decrease inadvertent movement of multimedia display device 10 along support surface 42.

Figure 5:
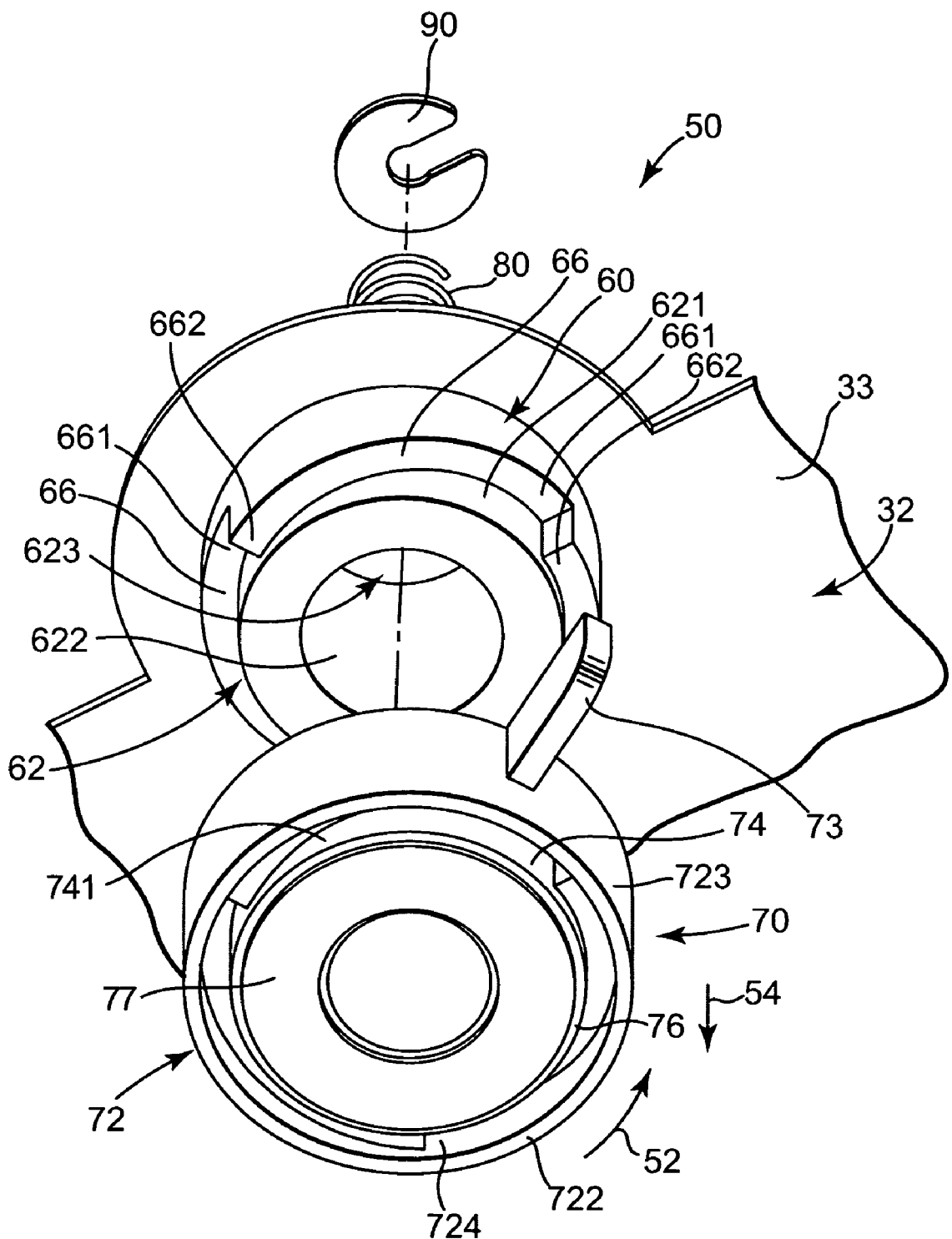
FIG. 5 is an exploded, bottom perspective view illustrating one embodiment of an adjustable support for a multimedia display device.
Figure 6:
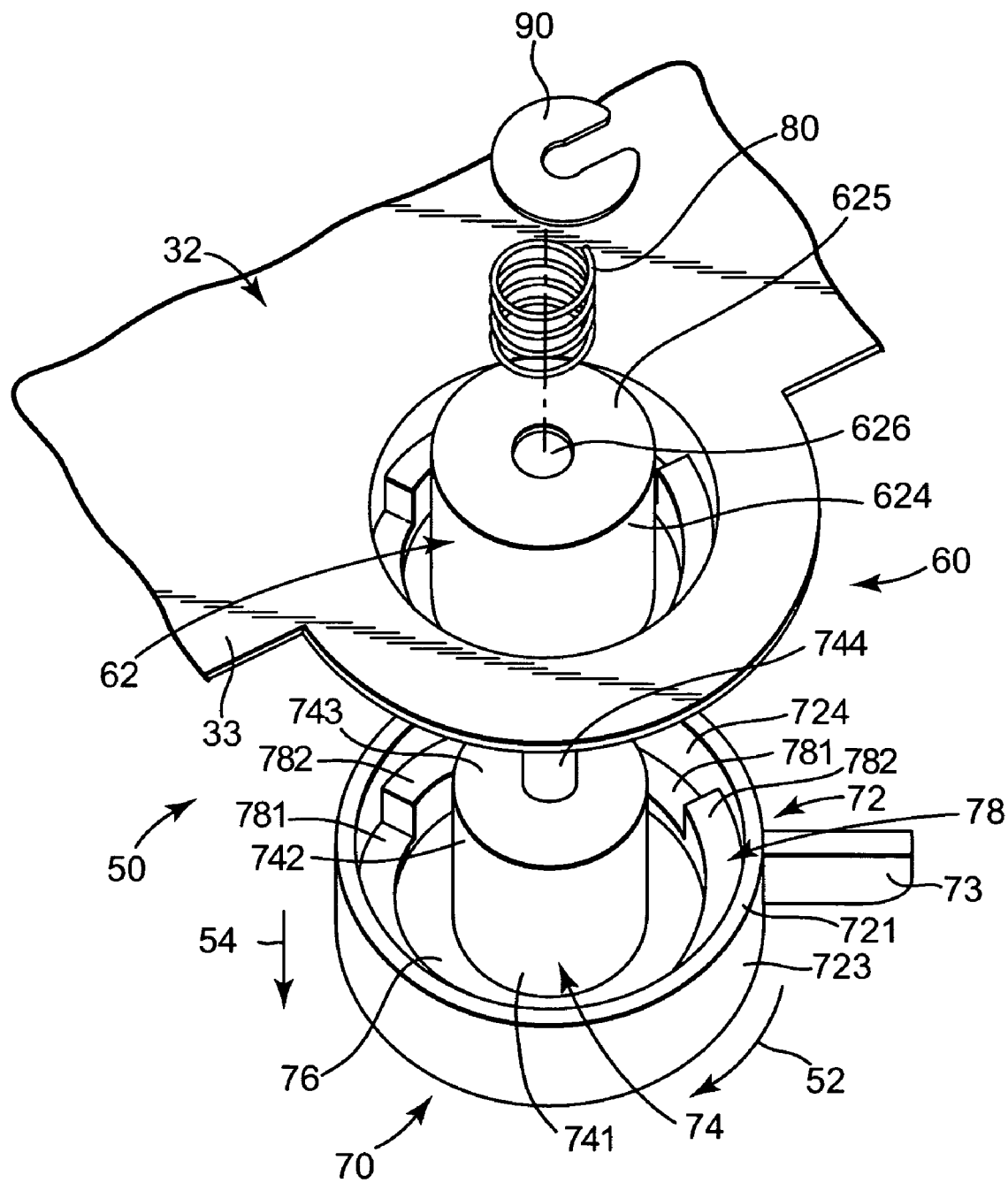
FIG. 6 is an exploded, top perspective view of the adjustable support of FIG. 5.

In one embodiment, at least one support 40 is an adjustable support 50. One embodiment of adjustable support 50 is illustrated in FIGS. 5 and 6. In one embodiment, adjustable support 50 includes a base 60, a foot 70, a spring 80, and a retainer 90. In one embodiment, base 60 extends from a flange 33 of shell 32. Flange 33 may extend, for example, from perimeter edge 36 (FIG. 2) of shell 32. In addition, base 60 may be formed integrally with and/or fixed with respect to shell 32.

In one embodiment, base 60 includes a cylindrical portion 62 defining an outer circumference or surface 621, an inner circumference or surface 622, and a cavity 623. In one embodiment, an interior end 624 of cylindrical portion 62 extends through an opening of flange 33 and into shell 32. In addition, an end wall 625 having an aperture 626 formed therein is provided at interior end 624 of cylindrical portion 62.

In one embodiment, base 60 includes a plurality of cam or ramp surfaces 66 formed around cylindrical portion 62. In one embodiment, ramp surfaces 66 are distributed at substantially equal intervals along a common circumference of cylindrical portion 62. As such, ramp surfaces 66 are circumferentially spaced with respect to one another at substantially equal intervals.

In one embodiment, ramp surfaces 66 are inclined ramps circumferentially spaced about outer surface 621. In addition, each ramp surface 66 is discrete from the other ramp surfaces 66. As such, each ramp surface 66 is separate and distinct from the other ramp surfaces 66.

In one embodiment, each ramp surface 66 has a first end 661 and a second end 662, wherein each second end 662 is spaced further from flange 33 than a respective first end 661. In one embodiment, ramp surfaces 66 are spaced such that second end 662 of one ramp surface 66 is adjacent to first end 661 of another ramp surface 66.

In one embodiment, first ends 661 of ramp surfaces 66 are linearly aligned with each other so as to be positioned along a first circumference of base 60, and second ends 662 of ramp surfaces 66 are linearly aligned with each other so as to be positioned along a second circumference of base 60 such that the second circumference of base 60 is spaced from the first circumference of base 60. As such, first ends 661 of ramp surfaces 66 are uniformly spaced from second ends 662.

In one embodiment, as illustrated in FIGS. 5 and 6, each ramp surface 66 includes a curvilinear surface. As such, each ramp surface 66 includes a linear and angled surface following the curvature of outer surface 621. In one embodiment, ramp surfaces 66 are textured or coated to increase friction when interacting with foot 70, as described below.

Foot 70 is configured to rotatably interact with base 60. In one embodiment, foot 70 includes a collar 72, a cylindrical portion 74, and a bottom or support wall 76. Collar 72 is substantially cylindrical and cylindrical portion 74 is concentrically positioned within collar 72. In one embodiment, collar 72 has an upper edge 721 and a lower edge 722 opposite upper edge 721, and includes an outer circumference or surface 723 and an inner circumference or surface 724.

In one embodiment, a handle 73 extends radially outward from outer surface 723 of collar 72. Handle 73 is sized, shaped, and/or textured to facilitate grasping of handle 73 by a user and manipulating of foot 70, as described below.

In one embodiment, foot 70 includes a plurality of engaging surfaces 78 formed within collar 72. In one embodiment, each engaging surface 78 contacts and interacts with one ramp surface 66 of base 60, as described below. In one embodiment, engaging surfaces 78 are inclined ramps circumferentially spaced within inner surface 724 of collar 72. In addition, each engaging surface 78 is discrete from the other engaging surfaces 78. As such, each engaging surface 78 is separate and distinct from the other engaging surfaces 78.

In one embodiment, each engaging surface 78 includes a curvilinear surface complimentary to a respective ramp surface 66. As such, each engaging surface 78 includes a linear and angled surface following the curvature of inner surface 724 of collar 72. In one embodiment, similar to ramp surfaces 66, each engaging surface 78 has a first end 781 and a second end 782 wherein each second end 782 is spaced further from bottom wall 76 of foot 70 than a respective first end 781. In one embodiment, engaging surfaces 78 are spaced such that second end 782 of one engaging surface 78 is adjacent to first end 781 of another engaging surface 78.

In one embodiment, first ends 781 of engaging surfaces 78 are linearly aligned with each other so as to be positioned along a first inner circumference of collar 72, and second ends 782 of engaging surfaces 78 are linearly aligned with each other so as to be positioned along a second inner circumference of collar 72 such that the second inner circumference of collar 72 is spaced from the first inner circumference of collar 72.

In one embodiment, cylindrical portion 74 of foot 70 has a lower edge 741 and an upper edge 742. In one embodiment, lower edge 741 is positioned substantially even with (i.e., in substantially the same plane as) lower edge 722 of collar 72. In one embodiment, cylindrical portion 74 extends beyond upper edge 721 of collar 72 and an end wall 743 is formed at upper edge 742. In one embodiment, an axle or shaft 744 extends from end wall 743. In one embodiment, shaft 744 is positioned concentrically and coaxially with end wall 743 and, therefore, cylindrical portion 74.

In one embodiment, bottom wall 76 of foot 70 extends between lower edge 722 of collar 72 and lower edge 741 of cylindrical portion 74 so as to define a substantially flat surface for interacting with support surface 42 of platform 44 (FIGS. 3 and 4). In one embodiment, a friction enhancing portion or anti-skid material or texture 77 is included on bottom wall 76 to prevent movement or sliding of multimedia display device 10 upon support surface 42 of platform 44 when multimedia display device 10 is supported by foot 70, as described below. In one embodiment, friction-enhancing portion 77 is formed of rubber.

Upon assembly of adjustable support 50, foot 70 is positioned to interact with base 60 such that collar 72 of foot 70 extends around and surrounds outer surface 621 of base 60. In addition, cylindrical portion 74 of foot 70 fits within cavity 623 of base 60. As such, shaft 744 of foot 70 extends through aperture 626 defined in end wall 625 of base 60. Notably, shaft 744 extends through and beyond aperture 626.

In one embodiment, spring 80 is longitudinally positioned around shaft 744 such that one end of spring 80 interacts with end wall 625. Spring 80 is compressed and retainer 90 is coupled to shaft 744 to maintain the compression of spring 80 against end wall 625. In one embodiment, spring 80 is configured to bias foot 70 toward shell 32. Accordingly, spring 80 maintains the position of foot 70 with respect to shell 32 and, therefore, base 60. Thus, even upon lifting of multimedia display device 10 from support surface 42 of platform 44, spring 80 maintains the position of foot 70 with respect to shell 32.

Assembly of foot 70 with base 60 positions each of the plurality of engaging surfaces 78 to interact with one of the plurality of ramp surfaces 66. In one embodiment, foot 70 is initially positioned with respect to base 60 such that first end 781 and second end 782 of each engaging surface 78 interacts with second end 662 and first end 661, respectively, of a corresponding ramp surface 66. In one embodiment, the plurality of ramp surfaces 66 includes three distinct or discrete ramp surfaces 66, and the plurality of engaging surfaces 78 includes three distinct or discrete engaging surfaces 78 thereby supporting foot 70 with respect to base 60 in a balanced manner.

During use, rotation of foot 70 with respect to base 60 causes each engaging surface 78 of foot 70 to ride along the corresponding ramp surface 66 of base 60. Due to the inclination of both ramp surfaces 66 and engaging surfaces 78, rotation of foot 70 results in vertical movement of foot 70.

With one support 40 being adjustable support 50, other supports 40 are referred to as stationary or non-adjustable supports 40. In one embodiment, as illustrated in FIGS. 3 and 4, each of the stationary or non-adjustable supports 40 extends between shell 32 and support surface 42 of platform 44 a fixed distance or first height $H_1$. Adjustable support 50, however, extends between shell 32 and support surface 42 a variable distance or second height $H_2$.

In one embodiment, as illustrated in FIGS. 5 and 6, rotation of foot 70 in the direction indicated by arrow 52 results in downward movement of foot 70 with respect to shell 32, as indicated by arrow 54. As such, downward movement of foot 70 with respect to shell 32 increases second height $H_2$ (FIGS. 3 and 4). Similarly, rotation of foot 70 in a direction opposite to that indicated by arrow 52 results in upward movement of foot 70 with respect to shell 32 (i.e., in a direction opposite of that indicated by arrow 54). As such, upward movement of adjustable support 70 with respect to shell 32 decreases second height $H_2$.

Notably, the degree of inclination of ramp surfaces 66 determines an extent to which foot 70 can be adjusted and, more specifically, the range of values of second height $H_2$. Thus, the higher the degree of inclination of each ramp surface 66, the wider the range of second height $H_2$ values. Understandably, higher degrees of inclination of ramp surfaces 66, as compared to lower degrees of inclination, require less degree of rotation of foot 70 to adjust foot 70 and vary second height $H_2$ a desired amount. In addition, with ramp surfaces 66 spaced circumferentially with respect to each other at substantially equal intervals, rotation of foot 70 for less than one revolution varies the distance foot 70 extends from shell 32 between a minimum value of second height $H_2$ and a maximum value of second height $H_2$. As such, a total amount of adjustment of foot 70 can be achieved by rotating foot 70 less than 360 degrees.

As illustrated in the embodiments of FIGS. 3 and 4, by varying second height $H_2$ with first height $H_1$ substantially constant, the orientation of projection line 26 and/or reference line 28 of lens 22 accordingly vary with respect to support surface 42. For example, as illustrated in the embodiment of FIG. 4, as adjustable support 50 is adjusted, the orientation of reference line 28 with respect to support surface 42 accordingly changes, thereby adjusting the tilt of image projector 12, and more specifically, lens 22 with respect to platform 44. As foot 70 is rotated, an angle $\theta_1$ is defined between support surface 42 and reference line 28. Angle $\theta_1$, therefore, represents side-to-side tilting of image projector 12. This side-to-side tilting of image projector 12 and, more particularly, lens 22, correspondingly varies the tilt of the projected image upon viewing surface 24. As such, foot 70 can be adjusted until the projected image has a desired orientation.

In addition, as illustrated in the embodiment of FIG. 3, adjustment of adjustable support 50 adjusts the orientation of projection line 26 with respect to support surface 42 and, therefore, the orientation of the projected image upon viewing surface 24. More specifically, if foot 70 is rotated in the direction indicated by arrow 52 (FIGS. 5 and 6), second height $H_2$ increases. In addition, an angle $\theta_2$ defined between support surface 42 and projection line 26 also increases as second height $H_2$ increases. As such, an increase (or decrease) in angle $\theta_2$ adjusts the position of the projected image upon viewing surface 24. Notably, adjustment of angle $\theta_2$ provides front-to-back tilting of image projector 12 and, more specifically, lens 22.

In one embodiment, rotation of foot 70 in a direction opposite of that indicated by arrow 52 decreases second height $H_2$. With first height $H_1$ substantially constant, a decrease in second height $H_2$ also changes angles $\theta_1$ and $\theta_2$. In one embodiment, when second height $H_2$ becomes smaller than first height $H_1$, angles $\theta_1$ and $\theta_2$ are negatively defined with respect to support surface 42. Furthermore, in one embodiment, when first height $H_1$ is equal to second height $H_2$, angles $\theta_1$ and $\theta_2$ are defined as zero as projection line 26 and reference line 28 are both oriented parallel with support surface 42.

In view of the above, adjustment of adjustable support 50 can be used to vary the orientation of reference line 28 with respect to support surface 42 and, therefore, the side-to-side tilt or leveling of image projector 12 and/or the orientation of projection line 26 with respect to support surface 42 and, therefore, the front-to-back tilt of image projector 12. Accordingly, adjustable support 50 can be used to adjust the side-to-side tilt and/or front-to-back tilt of image projector 12 so as to account for side-to-side and/or front-to-back tilt problems of platform 44 with respect to viewing surface 24.

Although illustrated and described above as having three supports in which one of the supports is an adjustable support 50, multimedia display device 10 can include any number of supports 40 spaced about perimeter edge 36, and any number of those supports 40 can be an adjustable support 50.

Figure 7:
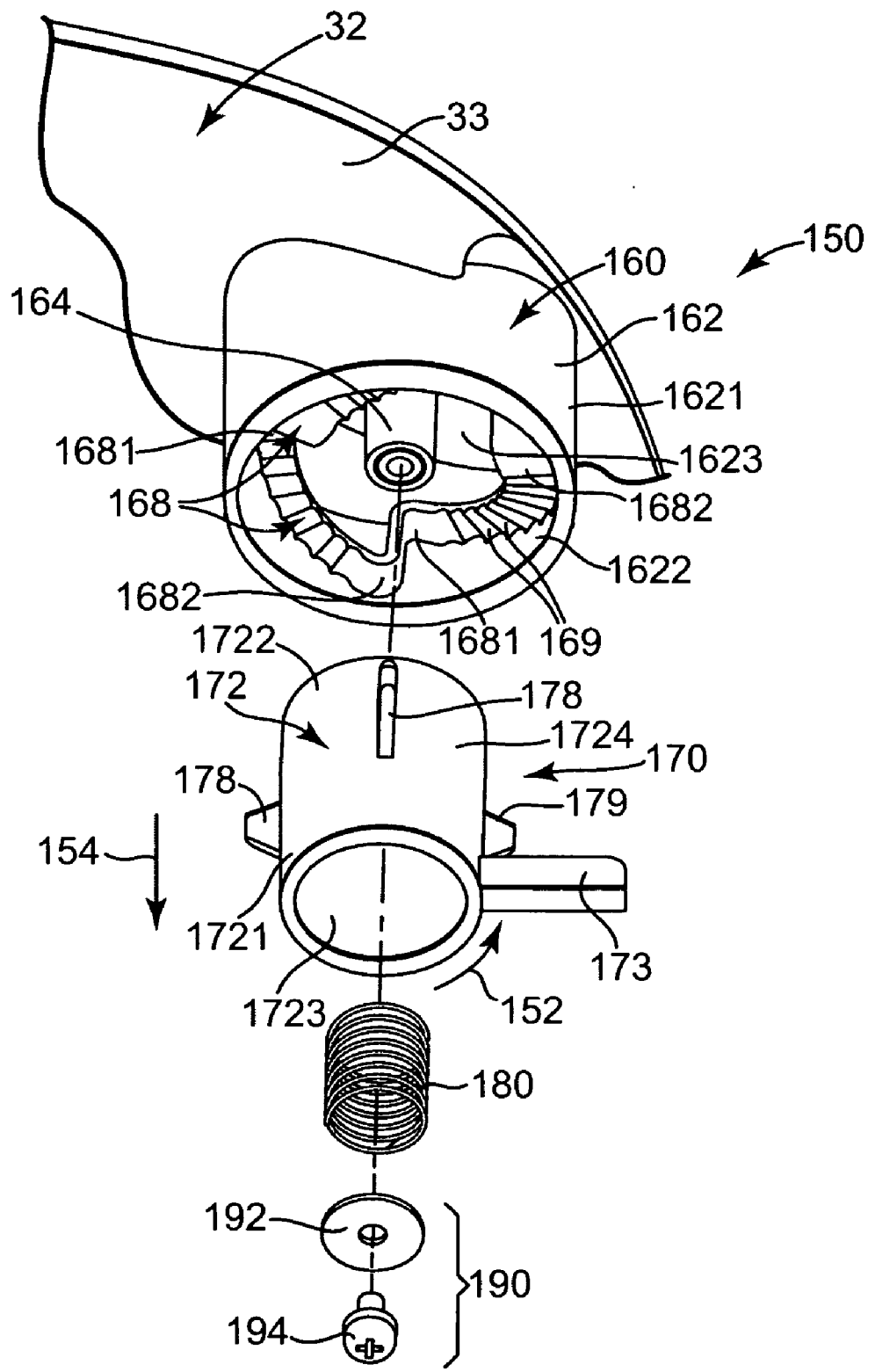
FIG. 7 is an exploded, bottom perspective view illustrating another embodiment of an adjustable support for a multimedia display device.
Figure 8:
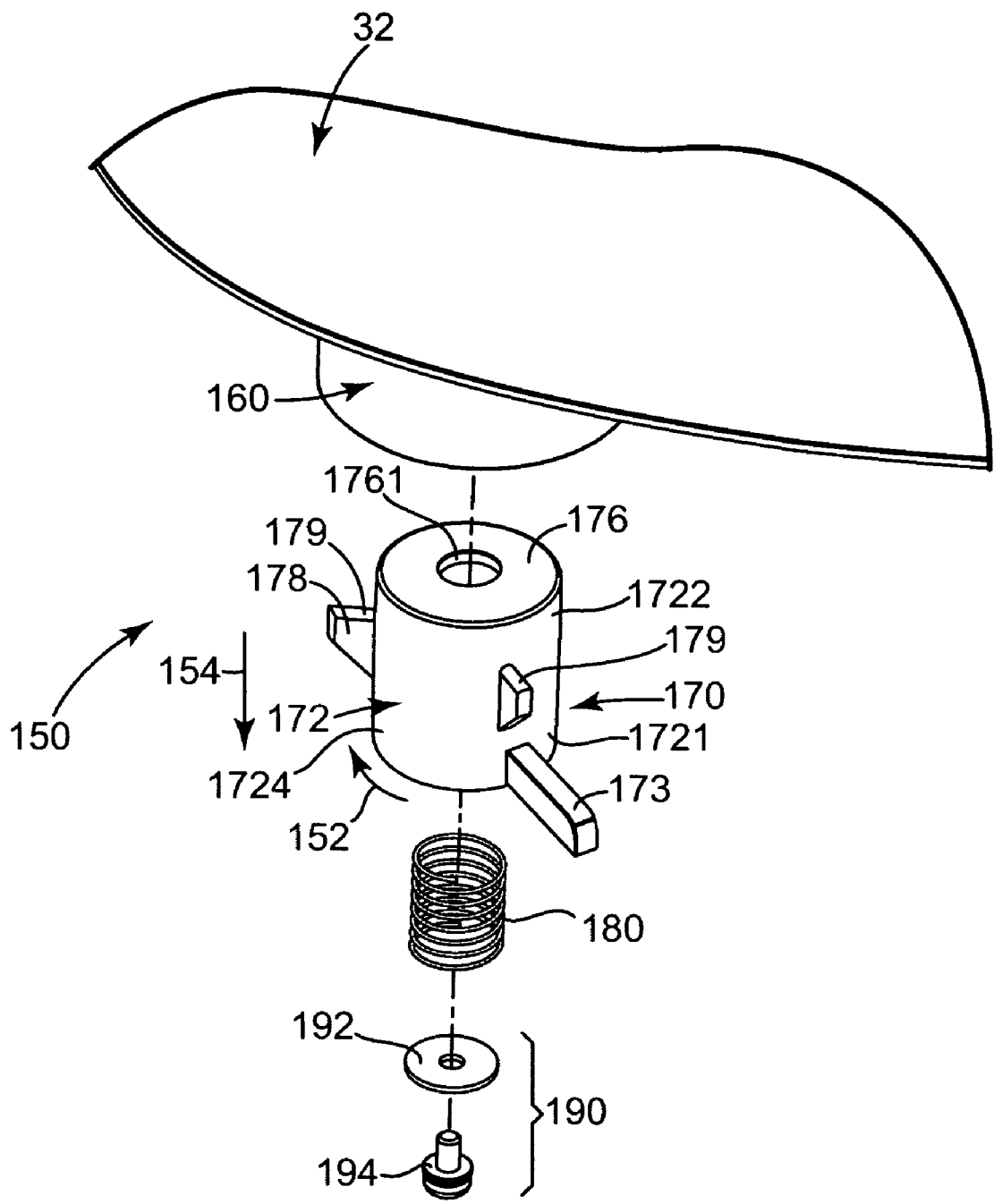
FIG. 8 is an exploded, top perspective view of the adjustable support of FIG. 7.

FIGS. 7 and 8 illustrate another embodiment of an adjustable support for multimedia display device 10. Adjustable support 150, similar to adjustable support 50 described above, allows second height $H_2$ to be varied and, therefore, enables image projector 12 to be leveled and/or tilted to adjust placement of the projected image upon viewing surface 24 (FIG. 3). In one embodiment, adjustable support 150 includes a base 160, a foot 170, a spring 180, and a retainer 190. In one embodiment, base 160 extends from flange 33 of shell 32 and, therefore, extends from perimeter edge 36 (FIG. 2) of shell 32. In one embodiment, base 160 is fixed with respect to shell 32. In one embodiment, base 160 is integrally formed with shell 32.

In one embodiment, base 160 includes a cylindrical portion 162 defining an outer circumference or surface 1621, an inner circumference or surface 1622, and a cavity 1623. In one embodiment, base 160 also includes a shaft 164 extended from flange 33 of shell 32 and through cavity 1623 of cylindrical portion 162. In one embodiment, shaft 164 is substantially cylindrical and concentrically positioned with respect to cavity 1623 of base 160. In one embodiment, shaft 164 is integrally formed with shell 32.

In one embodiment, base 160 additionally includes a plurality of cam or ramp surfaces 168 formed within cylindrical portion 162. In one embodiment, ramp surfaces 168 are distributed at substantially equal intervals along a common circumference of cylindrical portion 162. As such, ramp surfaces 168 are circumferentially spaced with respect to one another at substantially equal intervals.

In one embodiment, ramp surfaces 168 are inclined ramp surfaces circumferentially spaced along inner surface 1622. In addition, each ramp surface 168 is discrete from the other ramp surfaces 168. As such, each ramp surface 168 is separate and distinct from the other ramp surfaces 168.

In one embodiment, each ramp surface 168 has a first end 1681 and a second end 1682, wherein second end 1682 is spaced further from flange 33 than a respective first end 1681. In one embodiment, ramp surfaces 168 are spaced such that second end 1682 of one ramp surface 168 is adjacent to first end 1681 of another ramp surface 168. In one embodiment, first ends 1681 of ramp surfaces 168 are linearly aligned with each other so as to be positioned along a first circumference of base 160, and second ends 1682 of ramp surfaces 168 are linearly aligned with each other so as to be positioned along a second circumference of base 160 such that the second circumference of base 160 is spaced from the first circumference.

In one embodiment, as illustrated in FIGS. 7 and 8, each ramp surface 168 includes a stepped surface. As such, each ramp surface 168 includes a plurality of steps 169 following the curvature of inner surface 1622 of cylindrical portion 162. Notably, steps 169 of ramp surfaces 168 face downward or away from flange 33 of shell 32.

Foot 170 is configured to rotatably interact with base 160. In one embodiment, foot 170 includes a collar 172, a cap or end wall 176, and a plurality of wings or protrusions 178. In one embodiment, collar 172 is substantially cylindrical and has a lower edge 1721 and an upper edge 1722. In one embodiment, collar 172 has an inner circumference or surface 1723 and an outer circumference or surface 1724. In one embodiment, end wall 176 has an aperture 1761 formed therein. In one embodiment, aperture 1761 is substantially circular and sized to receive shaft 164 of base 160.

In one embodiment, protrusions 178 are circumferentially spaced and extend radially outward from outer surface 1724 of collar 172. In one embodiment, each protrusion 178 defines an engaging surface 179. As such, each engaging surface 179 is configured to interact with one ramp surface 168, as described below.

In one embodiment, a handle 173 extends radially from outer surface 1724 of collar 172. In one embodiment, handle 173 is provided adjacent lower edge 1721. Handle 173 is sized, shaped, and/or textured to facilitate grasping of handle 173 by a user and manipulating of foot 170, as described below.

Upon assembly of adjustable support 150, foot 170 is positioned to interact with base 160 such that shaft 164 of base 160 is received by aperture 1761 of foot 170. As such, foot 170 is rotatable about shaft 164. In addition, each engaging surface 179 interacts with one ramp surface 168.

In one embodiment, spring 180 is positioned around shaft 164 within collar 172 and retainer 190 is coupled to an end of shaft 164 extended through aperture 1761. As such, spring 180 biases foot 170 toward base 160. Accordingly, spring 180 maintains the position of foot 170 with respect to base 160. Thus, upon lifting of multimedia display device 10 from support surface 42 of platform 44, spring 180 maintains the position of foot 170 with respect to base 160. In one embodiment, retainer 190 includes a washer 192 and a screw 194, wherein screw 194 is threaded through washer 192 and into an end of shaft 164. Other arrangements for retaining spring 180 on shaft 164 are possible including, for example, retainer 90 as described above.

During use, rotation of foot 170 with respect to base 160 causes each engaging surface 179 of foot 170 to move or slide along one of the corresponding ramp surfaces 168 of base 160, thereby lowering or raising the position of foot 170 with respect to base 160. For example, if each of the engaging surfaces 179 is initially positioned near first end 1681 of the respective ramp surface 168 and foot 170 is rotated in the direction indicated by arrow 152, foot 170 will move in the vertical direction indicated by arrow 154 as each engaging surface 179 moves along the respective ramp surface 168 toward the second end 1682 of each ramp surface 168.

In one embodiment, steps 169 of ramp surfaces 168 partially impede movement of engaging surfaces 179 along ramp surfaces 168. As a result, a minimum rotational force applied to foot 170 to cause movement of foot 170 can be established. In addition, steps 169 allow foot 170 to be incrementally positioned and help maintain the established position of foot 170.

As illustrated in the embodiments of FIGS. 3 and 4, and similar to that described above with respect to adjustable support 50, movement of foot 170 with respect to base 160 increases or decreases second height $H_2$. Since first height $H_1$ remains substantially constant, movement of foot 170 accordingly varies angles $\theta_1$ and $\theta_2$ as defined between projection line 26 and reference line 28, respectively, and support surface 42. As such, rotation of foot 170 can be used to vary the orientation of reference line 28 with respect to support surface 42 and, therefore, the side-to-side tilt or leveling of image projector 12 and/or the orientation of projection line 26 with respect to support surface 42 and, therefore, the front-to-back tilt of image projector 12. Accordingly, adjustable support 150 can be used to adjust the side-to-side tilt and/or front-to-back tilt of image projector 12 so as to account for both leveling and/or tilt problems caused by platform 44 with respect to viewing surface 24.

Figure 9:
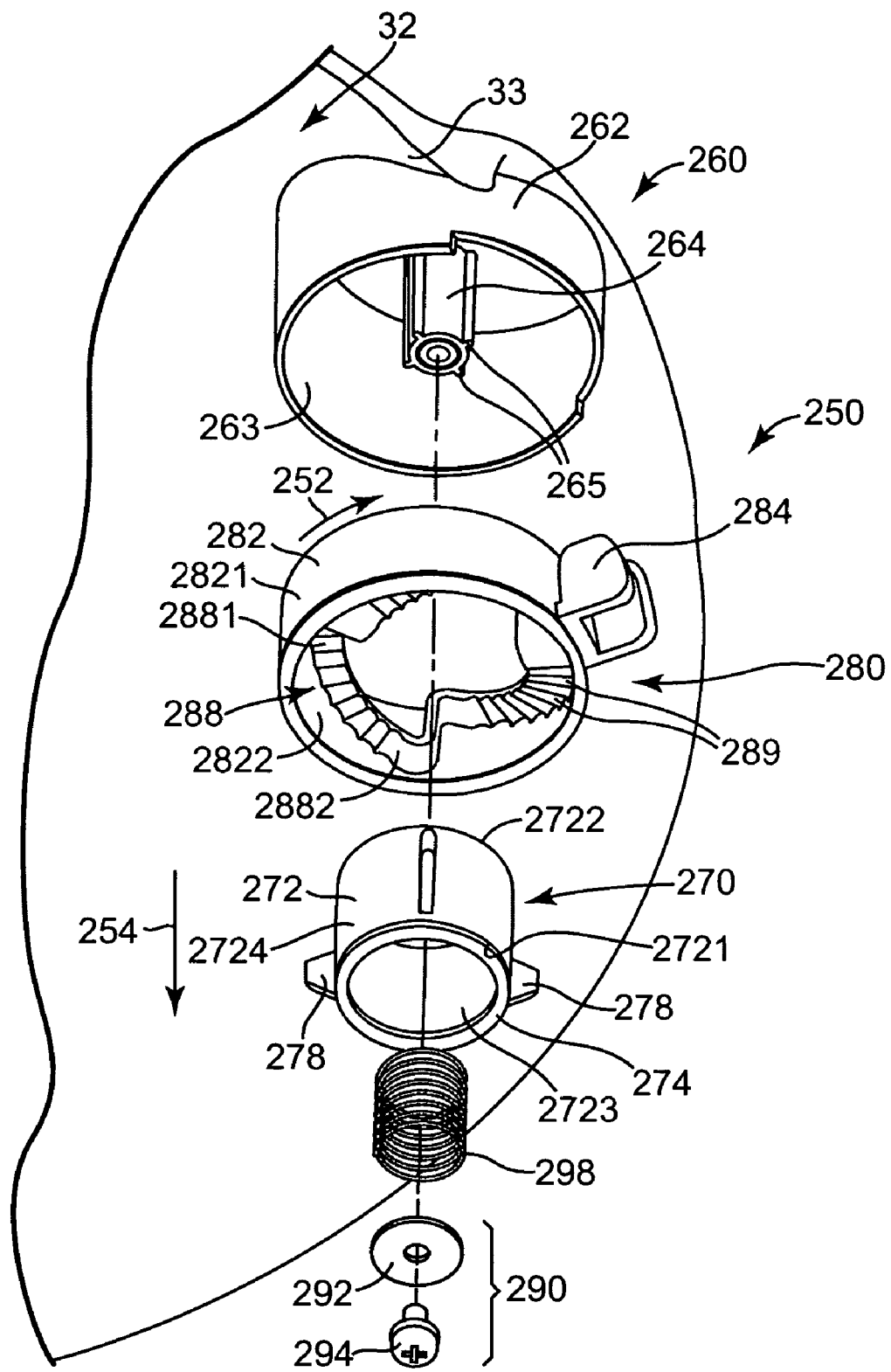
FIG. 9 is an exploded, bottom perspective view illustrating another embodiment of an adjustable support for a multimedia display device.
Figure 10:
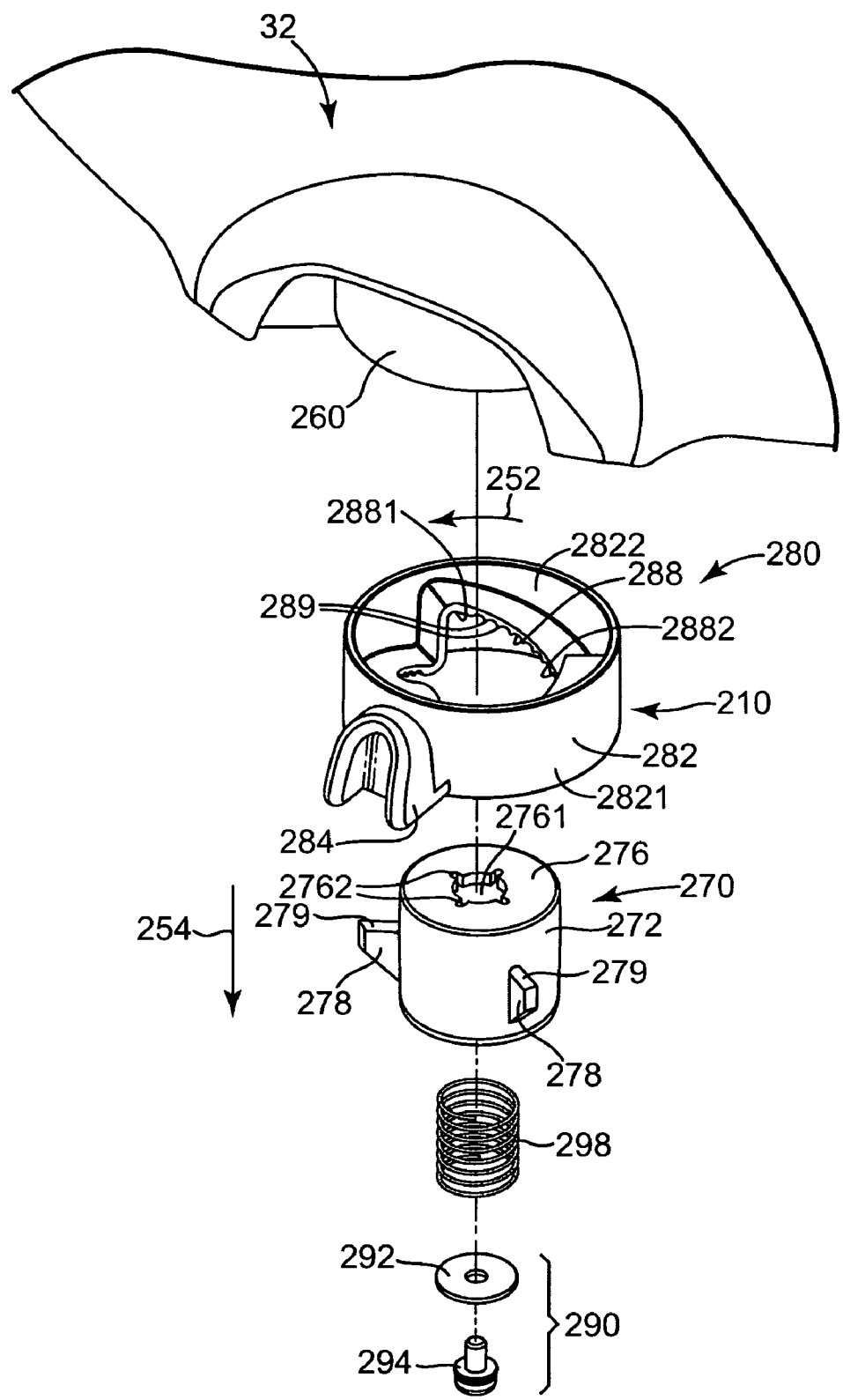
FIG. 10 is an exploded, top perspective view of the adjustable support of FIG. 9.

FIGS. 9 and 10 illustrate another embodiment of an adjustable support for multimedia display device 10. Adjustable support 250, similar to adjustable supports 50 and 150 described above, allows second height $H_2$ to be varied and, therefore, enables image projector 12 to be leveled and/or tilted to adjust placement of the projected image upon viewing surface 24 (FIG. 3). In one embodiment, adjustable support 250 includes a base 260, a foot 270, an adjustable ring 280, a retainer 290, and a spring 298. In one embodiment, base 260 extends from flange 33 of shell 32 and, therefore, extends from perimeter edge 36 (FIG. 2) of shell 32. In one embodiment, base 260 is fixed with respect to shell 32. In one embodiment, base 260 is integrally formed with shell 32.

In one embodiment, base 260 includes a cylindrical portion 262 defining a cavity 263. In one embodiment, base 260 also includes a shaft 264 extended from flange 33 of shell 32 and through cavity 263 of cylindrical portion 262. In one embodiment, shaft 264 is substantially cylindrical and includes longitudinal ribs 265 extended along an external surface of shaft 264. In one embodiment, ribs 265 are circumferentially spaced around shaft 264 and prevent rotation of foot 270 about shaft 264, as described below. In one embodiment, shaft 264 is concentrically positioned with respect to cavity 263 of base 260 and is integrally formed with shell 32.

In one embodiment, adjustment ring 280 includes an annular portion 282 defining an outer circumference or surface 2821 and an inner circumference or surface 2822. In one embodiment, adjustment ring 280 includes a plurality of cam or ramp surfaces 288 formed within annular portion 282. In one embodiment, ramp surfaces 288 are distributed at substantially equal intervals along a common circumference of annular portion 282. As such, ramp surfaces 288 are circumferentially spaced with respect to one another at substantially equal intervals.

In one embodiment, ramp surfaces 288 are inclined ramp surfaces circumferentially spaced along inner surface 2822 of annular portion 282. In addition, each ramp surface 288 is discrete from the other ramp surfaces 288. As such, each ramp surface 288 is separate and distinct from the other ramp surfaces 288.

In one embodiment, each ramp surface 288 has a first end 2881 and a second 2882, wherein second end 2882 is spaced further from flange 33 than a respective first end 2881. In one embodiment, ramp surfaces 288 are spaced such that second end 2882 of one ramp surface 288 is adjacent to first end 2881 of another ramp surface 288. In one embodiment, first ends 2881 of ramp surfaces 288 are linearly aligned with each other so as to be positioned along a first circumference of adjustment ring 280, and second ends 2882 of ramp surfaces 288 are linearly aligned with each other so as to be positioned along a second circumference of adjustment ring 280 such that the second circumference of adjustment ring 280 is spaced from the first circumference.

In one embodiment, as illustrated in FIGS. 9 and 10, each ramp surface 288 includes a stepped surface. As such, each ramp surface 288 includes a plurality of steps 289 following the curvature of inner surface 2822 of annular portion 282. Notably, steps 289 of ramp surfaces 288 face downward or away from flange 33 of shell 32.

In one embodiment, adjustment ring 280 includes a handle 284 extending radially from outer surface 2821. Handle 284 is sized, shaped, and/or textured to facilitate grasping of handle 284 by a user and manipulating (i.e., rotating) of adjustment ring 280 with respect to base 260 for the adjustment of adjustable support 250, as described below.

Foot 270 is configured to interact with base 260 and adjustment ring 280. In one embodiment, foot 270 is similar to foot 170 of adjustable support 150 and, as such, includes a cylindrical portion or collar 272, a cap or end wall 276, and a plurality of wings or protrusions 278. In one embodiment, collar 272 has a lower edge 2721 and an upper edge 2722. In addition, collar 272 is substantially cylindrical and has an inner circumference or surface 2723 and an outer circumference or surface 2724.

In one embodiment, lower edge 2721 of foot 270 is configured to interact with support surface 42 of platform 44 (FIGS. 3 and 4). In one embodiment, a friction enhancing member, such as a rubber ring 274 or cap, is provided on lower edge 2721 to interact with support surface 42.

In one embodiment, end wall 276 of foot 270 has an aperture 2761 formed therein. Aperture 2761 is sized to receive shaft 264 of base 260, as described below. In one embodiment, aperture 2761 is substantially circular and includes a plurality of notches 2762 circumferentially spaced about and radially extending from a perimeter of aperture 2761. Each of the notches 2762 is sized and positioned to interact with one of the ribs 265 of shaft 264 such that notches 2762 interact with ribs 265 to prevent rotation of foot 270 relative to base 260.

In one embodiment, protrusions 278 of foot 270 are circumferentially spaced and extend radially outward from outer surface 2724 of collar 272. In one embodiment, each protrusion 278 defines an engaging surface 279. As such, each engaging surface 279 is configured to interact with one ramp surface 288 of adjustment ring 280, as described below.

Upon assembly of adjustable support 250, adjustment ring 280 is positioned within cylindrical portion 262 of base 260 such that shaft 264 of base 260 projects through adjustment ring 280. As such, adjustment ring 280 is positioned within cylindrical portion 262 of base 260 such that adjustment ring 280 rotates within base 260. Foot 270 is mated with base 260 by receiving shaft 264 of base 260 in aperture 2761 such that each rib 265 is received by a complementary notch 2762 of aperture 2761. In this regard, foot 270 is mated with shaft 264 in a manner that generally prevents foot 270 from rotating relative to shaft 260 and, therefore, base 260. Foot 270, however, is allowed to translate longitudinally along shaft 264.

Foot 270 is positioned relative to adjustment ring 280 such that engaging surfaces 279 of protrusions 278 interact with respective ramp surfaces 288 of adjustment ring 280. In one embodiment, engaging surfaces 279 of foot 270 are biased against ramp surfaces 288 of adjustment ring 280 by spring 298. Spring 298 is positioned within foot 270 around shaft 264 and retainer 290 is coupled to an end of shaft 264 extended through aperture 2761. As such, retainer 290 retains spring 298 on shaft 264 and spring 298 biases foot 270 toward base 260. Accordingly, spring 298 maintains the position of foot 270 with respect to base 260 when multimedia display device 10 is lifted from support surface 42. In one embodiment, retainer 290 includes a washer 292 and a screw 294, wherein screw 294 is thread through washer 292 and into an end of shaft 264.

During use, rotation of adjustment ring 280 relative to base 260 and foot 270 causes each of the ramp surfaces 288 to rotate accordingly. Since foot 270 is prevented from rotating about shaft 264 but is allowed to translate along shaft 264, rotation of adjustment ring 280 causes each engaging surface 279 of foot 270 to follow one of the corresponding ramp surfaces 288 of adjustment ring 280, thereby lowering or raising the position of foot 270 with respect to base 260. For example, if each of the engaging surfaces 279 is initially positioned near first end 2881 of a respective ramp surface 288 and adjustment ring 280 is rotated in the direction indicated by arrow 252, foot 270 will move in the vertical direction indicated by arrow 254 as each engaging surface 279 follows the respective ramp surface 288 toward the second end 2882 of each ramp surface 288.

In one embodiment, steps 289 of ramp surfaces 288 partially impede movement of engaging surfaces 279 along ramp surfaces 288. As such, a minimum rotational force to be applied to adjustment ring 280 to cause movement of foot 270 can be established. In addition, steps 289 allow foot 270 to be incrementally positioned and help maintain the established position of foot 270.

As illustrated in the embodiments of FIGS. 3 and 4, and similar to that described above with respect to adjustable supports 50 and 150, movement of foot 270 with respect to base 260 increases or decreases second height $H_2$. Since first height $H_1$ remains substantially constant, movement of foot 270 accordingly varies angles $\theta_1$ and $\theta_2$ as defined between projection line 26 and reference line 28, respectively, and support surface 42. As such, rotation of adjustment ring 280 and the corresponding vertical movement of foot 270 can be used to vary the orientation of reference line 28 with respect to support surface 42 and, therefore, the side-to-side tilt or leveling of image projector 12 and/or the orientation of projection line 26 with respect to support surface 42 and, therefore, the front-to-back tilt of image projector 12. Accordingly, adjustable support 250 can be used to adjust the side-to-side tilt and/or front-to-back tilt of image projector 12 so as to count for both leveling and/or tilt problems caused by platform 44 with respect to viewing surface 24.

Notably, since adjustment ring 280 is rotated rather than foot 270, the height of adjustable support 250 can be adjusted without lifting multimedia display device 10 from support surface 42. In addition, although rotation of adjustment ring 280 causes foot 270 to move in the vertical direction with respect to base 260, rotation of adjustment ring 280 does not rotate or otherwise move foot 270 along support surface 42. This arrangement of foot 270 with respect to support surface 42 prevents sliding of foot 270 along support surface 42 during adjustment of adjustable support 250. As such, adjustable support 250 can be adjusted without having to lift multimedia display device 10 from support surface 42 as well as without movement of foot 270 along support surface 42, thereby eliminating possible scratches or other damage to support surface 42 by foot 270 while adjusting adjustable support 250.

Figure 11:
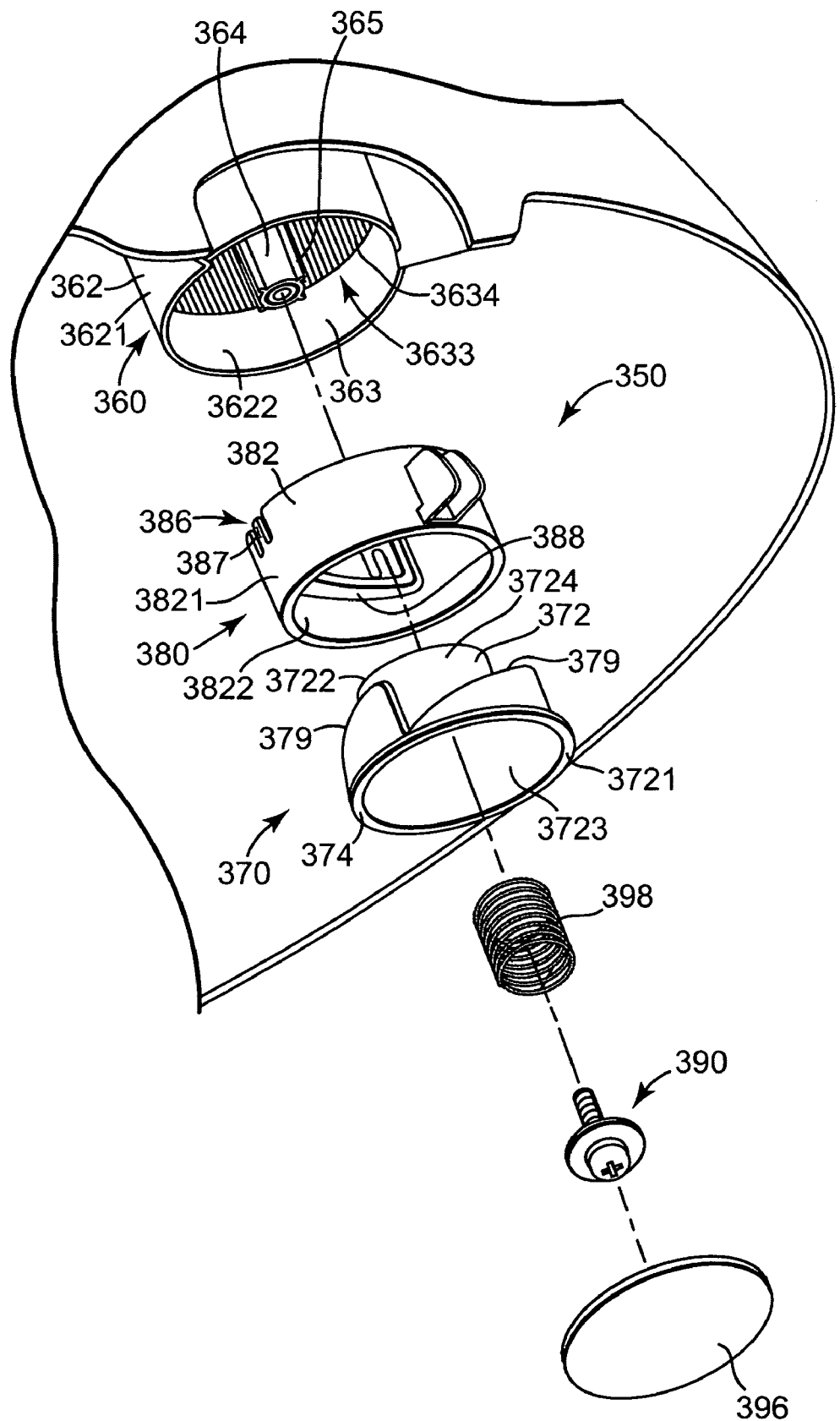
FIG. 11 is an exploded, bottom perspective view illustrating another embodiment of an adjustable support for a multimedia display device.

FIG. 11 illustrates another embodiment of an adjustable support for multimedia display device 10. Adjustable support 350, similar to adjustable supports 50, 150, and 250 described above, allows second height $H_2$ to be varied and, therefore, enables image projector 12 to be leveled and/or tilted to adjust placement of the projected image upon viewing surface 24 (FIG. 3). In one embodiment, adjustable support 350 is similar to adjustable support 250 and includes a base 360, a foot 370, an adjustment ring 380, a retainer 390, and a spring 398.

Similar to base 260 of adjustable support 250, base 360 of adjustable support 350 extends from flange 33 of shelf 32, and includes a cylindrical portion 362 defining a cavity 363 and a shaft 364 extended through cavity 363. In addition, shaft 364 is substantially cylindrical and includes longitudinal ribs 365 extended along an exterior surface of shaft 364.

Cylindrical portion 362 of base 360 includes an outer circumference or surface 3621 and an inner circumference or surface 3622. In one embodiment, a friction surface 3633 is provided along inner surface 3622 of cylindrical portion 362. Friction surface 3633 interacts with adjustment ring 380 to impede or increase resistance to rotation of adjustment ring 380, as described below. In one embodiment, friction surface 3633 is formed by a plurality of longitudinally extended ribs 3634 with corresponding longitudinal grooves formed along inner surface 3622 of cylindrical portion 362.

Similar to adjustment ring 280 of adjustable support 250, adjustment ring 380 of adjustable support 350 includes an annular portion 382 defining an outer circumference or surface 3821 and an inner circumference or surface 3822, and a plurality of cam or ramp surfaces 388 (only one of which is illustrated in FIG. 11) formed within annular portion 382. In one embodiment, ramp surfaces 388 are distributed at substantially equal intervals along a common circumference of annular portion 382. As such, ramp surfaces 388 are circumferentially spaced with respect to one another at substantially equal intervals.

In one embodiment, ramp surfaces 388 of adjustment ring 380 are inclined ramp surfaces circumferentially spaced along inner surface 3822 of annular portion 382. In addition, each ramp surface 388 is discrete from the other ramp surfaces 388. As such, each ramp surface 388 is separate and distinct from the other ramp surfaces 388. In one embodiment, each ramp surface 388 includes a curvilinear surface defined by a linear and angled surface following the curvature of inner surface 3822.

Similar to the interaction of foot 270 of adjustable support 250 with base 260 and adjustment ring 280, foot 370 of adjustable support 350 is configured to interact with base 360 and adjustment ring 380. In one embodiment, foot 370 includes a cylindrical portion or collar 372 and a bottom or supporting surface 374. In one embodiment, collar 372 has a lower edge 3721 and an upper edge 3722, and includes an inner circumference or surface 3723 and an outer circumference or surface 3724.

In one embodiment, an end wall (not shown) having an aperture (not shown) formed therein is provided at upper edge 3722 of collar 372 of foot 370. As such, the aperture receives and interacts with shaft 364 of base 360 to prevent rotation of foot 370 relative to base 360 and allow translation of foot 370 along shaft 364, in a manner similar to that described above with respect to foot 270.

In one embodiment, foot 370 includes a plurality of engaging surfaces 379 formed around collar 372 such that each engaging surface 379 interacts with one ramp surface 388 of adjustment ring 380. In one embodiment, engaging surfaces 379 are inclined ramps circumferentially spaced around outer surface 3724 of collar 372. In addition, each engaging surface 379 is discrete from the other engaging surfaces 379. As such, each engaging surface 379 is separate and distinct from the other engaging surfaces 379. In one embodiment, each engaging surface 379 includes a curvilinear surface defined by a linear and angled surface following the curvature of outer surface 3724 of collar 372.

In one embodiment, engaging surfaces 379 of foot 370 are biased against ramp surfaces 388 of adjustment ring 380 by spring 398 as positioned within foot 370 and around shaft 364. Retainer 390, including, for example, a washer and a screw, is secured to an end of shaft 364 to retain spring 398 in place. In one embodiment, a pad 396 is secured to supporting surface 374 of foot 370.

During use, in a manner similar to that described above with respect to adjustable support 250, rotation of adjustment ring 380 relative to base 360 and foot 370 causes each of the ramp surfaces 388 to rotate accordingly. Since foot 370 is prevented from rotating about shaft 364 but is allowed to translate along shaft 364, rotation of adjustment ring 380 causes each engaging surface 379 of foot 370 to follow one of the corresponding ramp surfaces 388 of adjustment ring 380, thereby lowering or raising the position of foot 370 with respect to base 360.

In one embodiment, adjustment ring 380 of adjustable support 350 includes a plurality of friction fingers 386 provided along outer surface 3821 of annular portion 382. In one embodiment, friction fingers 386 are spaced at substantially equal intervals around annular portion 382 and protrude from outer surface 3821 of annular portion 382. As such, friction fingers 386 interact with friction surface 3633 as formed within cylindrical portion 362 of base 360, as described below. In one embodiment, friction fingers 386 include ribbed protrusions 387 protruding beyond outer surface 3821 of annular portion 382.

Similar to adjustment ring 280 and base 260 of adjustable support 250, adjustment ring 380 of adjustable support 350 is positioned within cylindrical portion 362 of base 360. As such, adjustment ring 380 is rotatable relative to base 360. Friction fingers 386 of adjustment ring 380, however, interact with friction surface 3633 of base 360 to impeded rotation of adjustment ring 380 and provide incremental positioning of adjustment ring 380 relative to base 360 as adjustment ring 380 is rotated to adjust the height of adjustable support 350.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An adjustable support for a multimedia display device, the adjustable support comprising:
   a base;
   a ring rotatably coupled with the base and including a plurality of ramp surfaces; and
   a foot mated with the ring and coupled with the base, the foot including a plurality of engaging surfaces,
   wherein the plurality of ramp surfaces are separate from each other and distributed at substantially equal intervals along a common circumference, wherein each of the engaging surfaces interacts with a respective one of the ramp surfaces, and wherein rotation of the ring relative to the base causes each of the engaging surfaces to slide along the respective one of the ramp surfaces to vary a distance the foot extends from the base.

2. The adjustable support of claim 1, wherein rotation of the ring relative to the base for less than one revolution varies the distance the foot extends from the base between a minimum distance and a maximum distance from the base.

3. The adjustable support of claim 1, wherein the plurality of ramp surfaces are formed along a circumferential surface of the ring.

4. The adjustable support of claim 1, wherein the plurality of engaging surfaces are formed along a circumferential surface of the foot.

5. The adjustable support of claim 1, wherein the foot includes a collar and a plurality of protrusions radially extending from the collar, wherein each of the engaging surfaces are defined by one of the protrusions.

6. The adjustable support of claim 1, wherein the plurality of ramp surfaces includes a first plurality of inclined surfaces and the plurality of engaging surfaces includes a second plurality of inclined surfaces each complementary to one of the first plurality of inclined surfaces.

7. The adjustable support of claim 1, further comprising:
   a spring biasing the foot toward the base.

8. The adjustable support of claim 1, wherein each of the ramp surfaces includes at least one stepped surface.

9. The adjustable support of claim 1, wherein each of the ramp surfaces includes a curvilinear surface.

10. The adjustable support of claim 1, wherein the plurality of ramp surfaces includes three discrete ramp surfaces.

11. The adjustable support of claim 1, wherein the ring is rotatably mated with the foot.

12. The adjustable support of claim 1, wherein the foot is non-rotatably coupled with the base.

13. The adjustable support of claim 1, wherein the ring includes a handle configured to facilitate rotation of the ring relative to the base.

14. The adjustable support of claim 1, wherein the ring is interposed between the base and the foot.

15. The adjustable support of claim 1, wherein the base includes a rotation impeding feature, and the ring interacts with the rotation impeding feature.

16. The adjustable support of claim 15, wherein the rotation impeding feature includes a friction surface formed within the base, and the ring includes a plurality of friction fingers each interacting with the friction surface.

17. A multimedia display device, comprising:
a housing;
an image projector maintained within the housing;
a media player maintained within the housing;
a ring rotatably coupled with the housing and including a plurality of ramp surfaces; and
a foot mated with the ring and coupled with the housing, the foot including a plurality of engaging surfaces,
wherein the plurality of ramp surfaces are circumferentially spaced with respect to one another at substantially equal intervals, wherein each of the engaging surfaces contacts a respective one of the ramp surfaces, and wherein each of the engaging surfaces are adapted to slide along the respective one of the ramp surfaces to vary a distance the foot extends from the housing.

18. The multimedia display device of claim 17, wherein rotation of the ring relative to the housing for less than one revolution varies the distance the foot extends from the housing between a minimum distance and a maximum distance from the housing.

19. The multimedia display device of claim 17, wherein the plurality of ramp surfaces are formed along a circumferential surface of the ring.

20. The multimedia display device of claim 17, wherein the plurality of engaging surfaces are formed along a circumferential surface of the foot.

21. The multimedia display device of claim 17, wherein the foot includes a collar and a plurality of protrusions extending from the collar, wherein each of the engaging surfaces are defined by one of the protrusions.

22. The multimedia display device of claim 17, wherein the plurality of ramp surfaces includes a first plurality of inclined surfaces and the plurality of engaging surfaces includes a second plurality of inclined surfaces each complementary to one of the first plurality of inclined surfaces.

23. The multimedia display device of claim 17, wherein each of the ramp surfaces includes at least one stepped surface.

24. The multimedia display device of claim 17, wherein each of the ramp surfaces includes a curvilinear surface.

25. The multimedia display device of claim 17, wherein the plurality of ramp surfaces includes three discrete ramp surfaces.

26. The multimedia display device of claim 17, wherein the plurality of ramp surfaces and the plurality of engaging surfaces provide a plurality of discrete contact areas.

27. The multimedia display device of claim 17, wherein the plurality of ramp surfaces and the plurality of engaging surfaces provide a plurality of linearly spaced contact areas.

28. The multimedia display device of claim 17, further comprising:
a spring biasing the foot toward the housing.

29. The multimedia display device of claim 28, wherein the spring maintains contact between the engaging surfaces and the ramp surfaces.

30. The multimedia display device of claim 17, wherein the foot is adapted to linearly translate relative to the housing.

31. The multimedia display device of claim 17, wherein rotation of the ring relative to the housing varies a tilt angle of the image projector.

32. The multimedia display device of claim 17, wherein the housing includes a rotation impeding feature, and the ring interacts with the rotation impeding feature.

33. An adjustable support for a multimedia display device including an image projector, the adjustable support comprising:
means for supporting the image projector;
means for rotatably coupling a ring with the means for supporting the image projector;
means for non-rotatably coupling a foot with the means for supporting the image projector; and
means for varying a distance the foot extends from the means for supporting the image projector upon rotation of the ring with respect to the means for supporting the image projector, wherein at least one of the foot and the ring includes means for increasing friction between the foot and the ring.

34. An adjustable support for a multimedia display device including an image projector, the adjustable support comprising:
means for supporting the image projector;
means for rotatably coupling a ring with the means for supporting the image projector;
means for non-rotatably coupling a foot with the means for supporting the image projector;
means for biasing the foot toward the means for supporting the image projector; and
means for varying a distance the foot extends from the means for supporting the image projector upon rotation of the ring with respect to the means for supporting the image projector.

35. An adjustable support for a multimedia display device including an image projector, the adjustable support comprising:
means for supporting the image projector;
means for rotatably coupling a ring with the means for supporting the image projector;
means for non-rotatably coupling a foot with the means for supporting the image projector; and
means for varying a distance the foot extends from the means for supporting the image projector upon rotation of the ring with respect to the means for supporting the image projector, wherein at least one of the ring and the means for supporting the image projector includes means for impeding rotation of the ring relative to the means for supporting the image projector.

36. An adjustable support for a multimedia display device including an image projector, the adjustable support comprising:
means for supporting the image projector;
means for rotatably coupling a ring with the means for supporting the image projector;
means for non-rotatably coupling a foot with the means for supporting the image projector; and
means for varying a distance the foot extends from the means for supporting the image projector upon rotation of the ring with respect to the means for supporting the image projector, wherein the means for varying the distance the foot extends from the means for supporting the image projector includes a plurality of ramp surfaces and a plurality of engaging surfaces.

37. The adjustable support of claim 36, wherein the ring includes the plurality of ramp surfaces, and the foot includes the plurality of engaging surfaces.

38. A method of adjusting tilt of a multimedia display device including an image projector, the method comprising:
supporting the image projector with a support assembly;
rotatably coupling a ring to the support assembly, the ring including a plurality of ramp surfaces;
non-rotatably coupling a foot with the support assembly, the foot including a plurality of engaging surfaces; and
rotating the ring relative to the support assembly, including following each of the ramp surfaces with a respective one of the engaging surfaces and varying a distance the foot extends from the support assembly.

39. The method of claim 38, wherein rotating the ring relative to the support assembly includes rotating the ring for less than one revolution and varying the distance the foot extends from the support assembly between a minimum distance and a maximum distance from the support assembly.

40. The method of claim 38, wherein non-rotatably coupling the foot with the support assembly includes biasing the foot toward the support assembly.

41. The method of claim 38, wherein rotating the ring relative the support assembly includes rotating the ring in a first direction and increasing the distance the foot extends from the support assembly.

42. The method of claim 41, wherein rotating the ring relative the support assembly includes rotating the ring in a second direction opposite the first direction and decreasing the distance the foot extends from the support assembly.

43. The method of claim 38, wherein each of the ramp surfaces includes a curvilinear surface, and wherein rotating the ring relative to the support assembly includes following the curvilinear surface with the respective one of the engaging surfaces.

44. The method of claim 38, wherein each of the ramp surfaces includes a stepped surface, and wherein rotating the ring relative to the support assembly includes following the stepped surface with the respective one of the engaging surfaces.

* * * * *